Oct. 16, 1962 D. J. HAMMERAND 3,058,790

MOUNTING FOR A PHONOGRAPH TURNTABLE

Filed Dec. 7, 1960

INVENTOR.
Donald J. Hammerand
BY [signature]
ATTY.

United States Patent Office 3,058,790 Patented Oct. 16, 1962

3,058,790

MOUNTING FOR A PHONOGRAPH TURNTABLE

Donald John Hammerand, Chicago, Ill., assignor to Admiral Corporation, Chicago, Ill., a corporation of Delaware Filed Dec. 7, 1960, Ser. No. 74,329
5 Claims. (Cl. 308—227)

Figure 1:
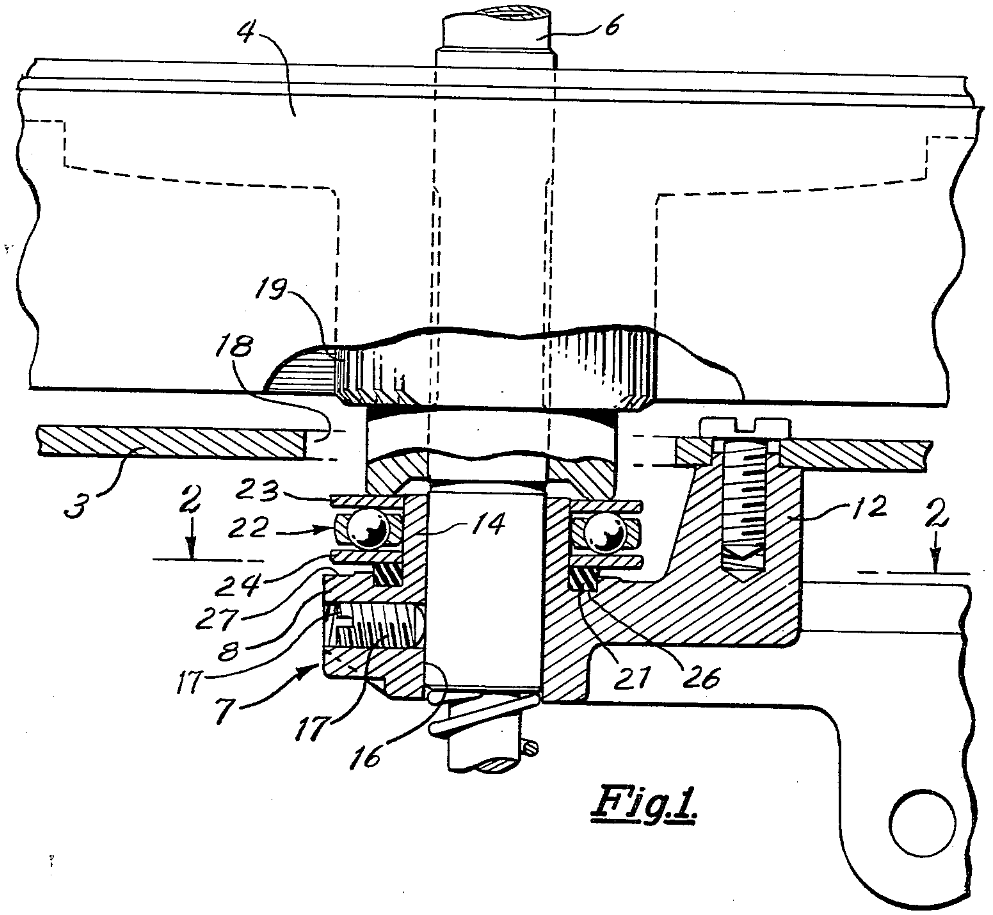

This invention relates to improvements in phonograph mechanism and in particular to a turntable mounting therefor.

For faithful reproduction of sound recorded on disc type phonograph records, it is essential that the records be rotated at speeds which are constant. Besides the number of turntable revolutions per minute constancy of record speed for reproduction also comprehends constancy in the rotary motion of any given record throughout any one complete revolution thereof. When there is even a slight variation in the velocity of a record in turning through a revolution the variation is accompanied by a variation in the sound reproduced from the record. During their reproduction, records are commonly supported by a turntable from which they derive rotary motion. Any deviation or fluctuation from a constant speed will introduce into the reproduced output an undesired variation or modulation. When the fluctuations, just referred to, occur at from one to six times a second, the consequent defect in accompanying reproduced sound output is commonly referred to as "wow." The degree to which a record speed may vary for wow to be apparent may be exemplified by stating that for reproduction of a 33⅓ r.p.m. record a drop in speed from 33.3 r.p.m. to 33.2 r.p.m. and then back to 33.3 is adequate to produce wow.

Of several circumstances which could be mentioned as responsible for intermittent departures from uniformity of the predetermined speed at which a record may be reproduced, one is vertical movement of the turntable, however slight, during the process of reproducing a record. This vertical movement of the turntable may be due principally to one or both of two causes. First there may be a slight lack of parallelism between opposed faces of at least one of the washers providing races of an axially effective ball bearing which carries the load of the turntable and records thereon. When there is obliquity, however slight, between opposed surfaces of the races, then the races partake of the nature of cams with respect to each other during their movement, one relative to the other, to lift the turntable slightly and then lower it. This vertical movement of the turnable is, of course, accompanied by a sligh decrease in record speed and is cause for wow. Washers for the vertically effective bearing are usually manufactured on a mass production basis and under the circumstances it is difficult to maintain parallelism, within close limits, between opposed surfaces of the races.

A second of the causes responsible for vertical movement of the turntable is encountered when the lower end of the turntable hub is not square with the axis of the turntable. And this condition of the turntable hub, together with a ball bearing race having opposed sides in slightly oblique relation to each other also act like cams tending to lift and lower the turntable.

It is also possible that both of the factors, just described, may be present and contribute to the vertical turntable movement. Whatever factor or factors are responsible for the vertical movement of the turntable, it is noteworthy that a substantial portion of the force primarily intended for driving the turntable is used for lifting the turntable, with possibly ten or twelve records thereon. Therefore less torque being consequently delivered to the turntable during its upward movement, by a comparatively small drive motor, the speed of the turntable decreases slightly and then increases accompanied, of course, by wow.

The present invention eliminates or greatly reduces wow caused by either of the defects just enumerated.

Another advantage attained by the invention is a reduction in motor noise due to the cyclic characteristics of the alternating current delivered to the turntable drive motor.

An additional advantage is gained by a reduction in noise created by the bearings and often discernible in the sound output.

Still another advantage is attained by a lowering of the frequency at which the turntable is resonant.

Therefore an object of the invention is to eliminate or greatly reduce wow during reproduction of phonograph records.

And another object is to reduce miscellaneous forms of noise frequently accompanying reproduction of recorded sound.

The invention involves novel cushioning means in the mounting for the turntable. The cushioning means compensates for the axial motion of the turntable due to a defect in formation of the hub thereof when one of the races is defectively formed and/or both of the races are defectively formed as previously indicated.

Figure 2:
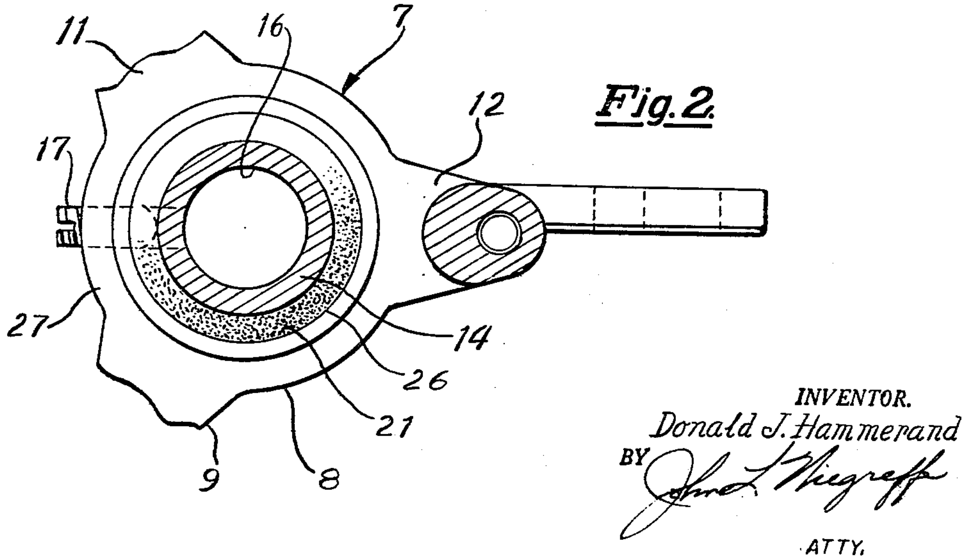

Other objects and advantages of the invention will become apparent from the following description taken in conjunction with the accompanying drawings wherein:

FIG. 1 is a fragmentary side elevational view of record player mechanism including a turntable and mounting, parts being partly in elevation and partly broken away; and FIG. 2 is a transverse section taken on line 2—2 of FIG. 1, the spindle having been removed.

The record player mechanism includes a base plate 3, a turntable 4 and spindle 6. Both turntable 4 and spindle 6 are supported from the base plate 3 by a bracket 7. It has a planar portion or web 8 and radial arms 9, 11 and 12 each of which is bolted to the base plate 3 and formed for the web 8 to be arranged in parallel and offset relation to the base plate. The bracket 7 is further formed with an upwardly extending, central pintle or boss 14 which has a central bore 16 in which the spindle 6 is received, and secured by a set screw 17. The pintle 14 is arranged below an aperture 18, in the base plate, so that a hub 19 of the turntable, may extend downward through aperture 18 and be supportingly spaced from the web 8 by an annular element 21 and an antifriction bearing 22, both element and bearing being threaded over the boss 14 and thus maintained in coaxial relationship to the spindle 6. The antifriction bearing 22 may be of the axially effective ball type having upper and lower races 23 and 24. While the turntable hub 19 is journaled on the spindle 6 the lower end of said hub rests on the race 23. The lower race 24, in turn, rests on the annular member 21 which is received in an annular groove 26 in the web 8.

In manufacture of such items as the washers or races 23 and 24 by mass production methods it is difficult to maintain uniformity of absolute parallelism between opposite flat faces of the races. An when the opposed faces of one of the races are in oblique relation to each other, even though the obliquity be microscopic, the defect tends to cause canting of the turntable, if no provision is made for cushioning the turntable mounting. If both races 23 and 24 are similarly and concurrently defective, their defect is accompanied by minute axial motion of the turntable during its rotation as one of the races turns relative to the other race of the bearing 22, the vertical movement being accompanied by wow.

Therefore for the annular element 21 to be in keeping with the invention, the element must be resilient to withstand deformation, within its elastic limit, and deformation unequally at diametrically opposite edges thereof, yet be sufficiently resistant to compression to support the turntable and records thereon in such a way that, in operation, the lower race 24 remains spaced from the web 8. Also, it was ascertained by test that when the annular element 21 is formed of some shock absorbent material that wow is reduced to such an extent that it is negligible.

The annular element 21 is therefore formed of a resilient plastic material such as artificial rubber owing to its resiliency, its quality of being resistant to oils and greases and resistance to defect by the heat generated in an automatic record player during reproduction of records. A form of artificial rubber found by tests to be satisfactory as material from which the annular cushioning elements 21 can be formed is known to the trade as "neoprene."

In order to facilitate compression of the annular element 21 unequally on opposite sides of the boss 14 the cross-sectional area of the annular element should be small by comparison to the size of the corresponding size of the antifriction bearing 22. In proportion to the bearing 22 of a record player as now maufactured, the overall diameter of the element 21 is less than the pitch diameter of the ball bearing 22, and about $\frac{3}{32}''$ greater in overall diameter than the diameter of the pintle 14. When relaxed; that is, without the load of the turntable thereon the annular element is about $\frac{1}{32}$ of an inch thick. When lodged in the groove 26 and supporting the loaded turntable the element 21 spaces the bearing 22 from the web 8. This enables one or both of the races to tip within slight limits if their opposed faces are slightly oblique relative to each other. If desired, the surface of the web 8 may be relieved at 27 beyond an arc slightly spaced from the groove 26 so that there may be adequate clearance for tipping of the lower race 24.

While the annular element 21 thus undergoes normal deformation transversely thereof by the weight of the turntable, it should be noted that obliquity of the races 23 or 24, or even a lower end on the turntable 18 minutely at variance from a perpendicular relationship to the axis of the turntable, may be responsible for greater pressure on one side of the annular element than on the diametrically opposite side of said element. Furthermore, this unequal deformation of the element 21 may be moved about the axis of the turntable without rotation of the element 21. This quality of the annular element has a compensating action on the vertical position of the turntable. Sudden increases in thickness of the antifriction bearing 22 would otherwise have a tendency to lift and lower the turntable when opposed sides of the races are not absolutely parallel.

Since use of the element 21 substantially eliminates vertical movement of the turntable, the entire rotary motion from a motor, not shown, can now be employed for operating the turntable since substantially no portion of the motor torque is diverted to lifting the turntable. Consequently the turntable may be operated without fluctuations in speed to avoid wow due to the form of turntable movement.

While a single embodiment of the present invention has been shown and described, it will be apparent that to those skilled in the art that modifications and departure may be made therefrom without departing from the spirit and scope of the present invention.

I claim:

1. In a record player having a base plate and a bracket supported therefrom to extend under a turntable having a hub, bearing means comprising a composite annular turntable support and a unitary annular support in engagement therewith, said supports spacing said hub from said bracket, said composite support having a plurality of rotary and rigid bearing members, said unitary support being resilient and of outer diameter less than the outer diameter of said composite support whereby said composite support is cantilivered outwardly from said unitary support and adapted to be tipped about said unitary support by minute and eccentric malformations of said rigid bearing members as they rotate thereby to prevent vertical movements of said turntable during its operation by deforming said unitary support within its elastic limits.

2. In combination, (*a*) support means;
(*b*) a vertical shaft extending upward from said support means;
(*c*) an annular thrust bearing fitted about said shaft and comprising a rotatable upper disk, a non-rotatable lower disk, and a plurality of individually rotatable bearing members confined between the inner faces of said disks;
(*d*) a turntable mounted for rotation on said shaft above said thrust bearing;
(*e*) a resilient annular support member fitted on said shaft in engagement with the outer face of one of said disks, said support member being of substantially smaller outside diameter than said disks;
(*f*) the entire weight of said turntable being supported by said thrust bearing and by said support member;
(*g*) whereby eccentric forces due to non-uniformities or misalignments tending to tilt the turntable or move it vertically during rotation thereof will be absorbed as vertical or tilting movements in the disk that engages said support member and corresponding deformations of said support member.

3. In combination, (*a*) support means;
(*b*) a vertical shaft extending upward from said support means;
(*c*) an annular thrust bearing fitted about said shaft and comprising a rotatable upper disk, a non-rotatable lower disk, and a plurality of individually rotatable bearing members confined between the inner faces of said disks;
(*d*) a turntable mounted on said upper disk for rotation therewith;
(*e*) a resilient annular support member fitted about said shaft and mounted for vertical support on said support means, said lower disk being supported thereupon, said support member being of substantially smaller outside diameter than said lower disk;
(*f*) whereby eccentric forces due to non-uniformities or misalignments of said thrust bearing that tend to tilt the turntable or move it vertically during rotation thereof will be absorbed instead as tilting or vertical movements in said lower disk and corresponding deformations of said support member.

4. In combination, (*a*) support means;
(*b*) a vertical shaft extending upward from said support means;
(*c*) an annular thrust bearing fitted about said shaft and comprising a rotatable upper disk, a non-rotatable lower disk, and a plurality of individually rotatable bearing members confined between the inner faces of said disks;
(*d*) a turntable mounted for rotation on said shaft above said thrust bearing;
(*e*) a neoprene annular support member fitted on said shaft in engagement with the outer face of one of said disks, said support member being of substantially smaller outside diameter than said disks and substantially smaller axial thickness than said thrust bearing;
(*f*) the entire weight of said turntable being supported by said thrust bearing and by said support member;

(g) whereby eccentric forces due to non-uniformities or misalignments tending to tilt the turntable or move it vertically during rotation thereof will be absorbed as vertical or tilting movements in the disk that engages said support member and corresponding deformations of said support member.

5. In combination, (a) support means;

(b) a vertical shaft extending upward from said support means;

(c) an annular thrust bearing fitted about said shaft and comprising a rotatable upper disk, a non-rotatable lower disk, and a plurality of individually rotatable bearing members confined between the inner faces of said disks;

(d) a turntable mounted on said upper disk for rotation therewith;

(e) a resilient annular support member with high internal damping properties fitted about said shaft and mounted for vertical support on said support means, said lower disk being supported thereupon, said support member being of substantially smaller outside diameter than said lower disk and substantially smaller axial thickness than said thrust bearing;

(f) whereby eccentric forces due to non-uniformities or misalignments of said thrust bearing that tend to tilt the turntable or move it vertically during rotation thereof will be absorbed instead as tilting or vertical movements in said lower disk and corresponding deformations of said support member.

References Cited in the file of this patent

UNITED STATES PATENTS

| | | |
|---|---|---|
| 1,854,941 | Kiel | Apr. 19, 1932 |
| 1,965,407 | Doughty | July 3, 1934 |
| 2,424,492 | Morris | July 22, 1947 |

FOREIGN PATENTS

| | | |
|---|---|---|
| 334,679 | Great Britain | Sept. 11, 1930 |
| 844,480 | Great Britain | Aug. 10, 1960 |